(12) United States Patent
Emory

(10) Patent No.: US 10,561,074 B2
(45) Date of Patent: Feb. 18, 2020

(54) PLANT SKIRT AND METHOD FOR USE THEREOF

(71) Applicant: Doreen J. Emory, Palmer, PA (US)

(72) Inventor: Doreen J. Emory, Palmer, PA (US)

( * ) Notice: Subject to any disclaimer, the term of this patent is extended or adjusted under 35 U.S.C. 154(b) by 288 days.

(21) Appl. No.: 14/998,777

(22) Filed: Feb. 16, 2016

(65) Prior Publication Data

US 2017/0231171 A1 Aug. 17, 2017

(51) Int. Cl.
*A01G 13/02* (2006.01)

(52) U.S. Cl.
CPC .................. *A01G 13/0281* (2013.01)

(58) Field of Classification Search
CPC .......................... A01G 13/02; A01G 13/0281
USPC ....................................... 47/9, 32.4
See application file for complete search history.

(56) References Cited

U.S. PATENT DOCUMENTS

| | | | | |
|---|---|---|---|---|
| 1,436,139 A | * | 11/1922 | Bailey ................. | A01G 13/0287 47/9 |
| 1,704,801 A | | 3/1929 | Oscar ................................. | 47/30 |
| 1,931,602 A | * | 10/1933 | Colman ............. | A01G 13/0281 47/32 |
| 2,949,698 A | * | 8/1960 | Downey ............. | A01G 13/0281 47/30 |
| 2,978,837 A | | 4/1961 | James ................................. | 47/32 |
| 3,305,969 A | | 2/1967 | Mattson ............................... | 47/32 |
| 3,571,972 A | * | 3/1971 | Carter, Jr. .......... | A01G 13/0281 47/30 |
| 3,704,004 A | * | 11/1972 | Carter, Jr. ................ | A01K 3/00 256/1 |
| 3,727,347 A | * | 4/1973 | Barnes ............... | A01G 13/0281 428/17 |

(Continued)

FOREIGN PATENT DOCUMENTS

| | | | | |
|---|---|---|---|---|
| DE | 2261908 A1 | * 7/1974 | ......... | A01G 13/0281 |
| DE | 10118360 | 10/2002 | | |
| JP | 2010045988 | 3/2010 | ............... | A01G 1/00 |

OTHER PUBLICATIONS

<u>Kraft Paper</u>, as found on <https://en.wikipedia.org/wiki/Kraft_paper> on Jan. 23, 2008, courtesy of "WayBackMachine" <https://archive.org/web/web.php>. (Year: 2008).*

(Continued)

*Primary Examiner* — Magdalena Topolski
*Assistant Examiner* — Morgan T Barlow
(74) *Attorney, Agent, or Firm* — Ernest D. Buff & Associates, LLC; Ernest D. Buff; Margaret A. LaCroix

(57) ABSTRACT

A plant skirt provides a weed barrier system that is easy to construct and install, and virtually eliminates weed encroachment. The plant skirt comprises a barrier member having a substantially flat body constructed from landscaping material and having an outer rim edge. The body includes a weighted edge perimeter, wherein the perimeter is constructed having sand therein. At least one edge area of the body has a weighted edge perimeter including an elongated slit. The elongated slit extends to and terminates at a center aperture in the flat body. The elongated slit has overlapping capable sides, and the center aperture is a small opening appointed to surround a plant's stem so that the stem is flush against the center aperture and a weed cannot easily grow between the center aperture and the stem.

17 Claims, 6 Drawing Sheets

(56) References Cited

U.S. PATENT DOCUMENTS

| | | | | |
|---|---|---|---|---|
| 3,857,195 A | * | 12/1974 | Johnson | A01G 13/0281 47/31.1 |
| 3,862,876 A | * | 1/1975 | Graves | E04G 21/28 150/901 |
| 3,891,423 A | * | 6/1975 | Stanley | A01G 13/0281 442/123 |
| 4,256,046 A | * | 3/1981 | Salvano | A01G 9/0295 47/73 |
| 4,268,992 A | * | 5/1981 | Scharf, Sr. | A01G 13/0243 47/21.1 |
| 4,348,831 A | * | 9/1982 | Chambers | A01G 9/12 47/32 |
| 4,584,789 A | * | 4/1986 | Jean | A01G 13/0281 47/23.1 |
| 4,627,191 A | * | 12/1986 | Bergere | A01G 29/00 47/32 |
| 4,648,203 A | * | 3/1987 | Worzek | A01G 13/0281 47/32 |
| D295,491 S | * | 5/1988 | Drumheller | A01G 13/0281 D8/1 |
| D299,409 S | * | 1/1989 | Inglis | A01G 13/0281 D8/1 |
| 4,794,726 A | * | 1/1989 | Fawcett | A01C 1/044 47/9 |
| 4,831,776 A | * | 5/1989 | Fritch | A01G 9/28 47/33 |
| D301,536 S | * | 6/1989 | Spear | A01G 13/0281 D34/1 |
| 4,858,378 A | * | 8/1989 | Helmy | A01G 13/0281 47/33 |
| D303,750 S | * | 10/1989 | Inglis | A01G 13/0281 D8/1 |
| 4,986,025 A | * | 1/1991 | Imperial | A01G 13/0281 47/2 |
| 5,009,031 A | * | 4/1991 | Knop | D04H 1/4209 47/64 |
| 5,058,317 A | * | 10/1991 | McMurtrey | A01G 13/0281 428/136 |
| 5,085,001 A | * | 2/1992 | Crawley | A01G 13/0281 47/30 |
| 5,157,867 A | * | 10/1992 | Fritch | A01G 9/28 47/33 |
| 5,171,390 A | * | 12/1992 | Travers | A01G 9/02 156/212 |
| 5,184,421 A | * | 2/1993 | Meharg | A01G 13/0212 47/21.1 |
| 5,231,793 A | * | 8/1993 | Allen | A01G 13/0281 47/32 |
| 5,285,594 A | | 2/1994 | Penny | 47/9 |
| 5,323,557 A | | 6/1994 | Sonntag | 47/32 |
| 5,367,822 A | * | 11/1994 | Beckham | A01G 13/0281 47/32 |
| 5,379,558 A | | 1/1995 | Mason, III | 52/105 |
| 5,396,731 A | * | 3/1995 | Byrne | A01G 13/0281 47/32 |
| 5,502,921 A | * | 4/1996 | Hyslop | A01G 13/0281 47/32 |
| 5,509,231 A | * | 4/1996 | Marcoux | A01G 13/0281 47/32 |
| 5,528,855 A | * | 6/1996 | Kapphahn | A01G 13/0281 47/32 |
| 5,605,009 A | * | 2/1997 | Elder | A01G 13/0281 47/32 |
| 5,647,951 A | | 7/1997 | Bayer | 156/62.2 |
| 5,709,049 A | * | 1/1998 | Baird | A01G 13/0281 47/21.1 |
| 5,762,449 A | * | 6/1998 | Hey | E02B 3/04 405/81 |
| 5,794,378 A | * | 8/1998 | Beatrez | A01G 13/0281 47/32 |
| D408,233 S | * | 4/1999 | Price | D8/1 |
| 6,128,852 A | * | 10/2000 | Hansen | A01G 20/30 47/32 |
| 6,195,935 B1 | * | 3/2001 | Bellucci | A01G 13/0281 47/9 |
| 6,311,911 B1 | | 11/2001 | Bayer | 241/294 |
| 6,330,762 B1 | * | 12/2001 | Puspurs | A01G 13/0281 47/32 |
| 6,349,500 B1 | * | 2/2002 | Popham | A01G 13/0281 2/222 |
| 6,446,400 B1 | * | 9/2002 | Block | A01G 13/0281 47/32 |
| 6,705,044 B2 | | 3/2004 | Clancey | 47/32 |
| 6,922,952 B2 | * | 8/2005 | Htoon | B44F 9/04 239/69 |
| 6,976,334 B1 | | 12/2005 | Bowditch | 47/32 |
| D515,370 S | * | 2/2006 | Huegel | A01G 7/06 D8/1 |
| 7,083,358 B2 | * | 8/2006 | Grosjean | E02B 3/122 405/129.9 |
| 7,128,668 B2 | * | 10/2006 | Purcell | A63B 69/0002 473/504 |
| D562,647 S | * | 2/2008 | Baars | D04H 1/4209 D8/1 |
| 8,225,546 B2 | | 7/2012 | Tajima et al. | 47/32.7 |
| 8,881,450 B2 | * | 11/2014 | Essafi | A01G 17/04 47/32.4 |
| D751,355 S | * | 3/2016 | Vizachero | A01C 1/044 D8/1 |
| 9,493,915 B2 | * | 11/2016 | Rodriguez | A01G 13/0281 |
| 2003/0182852 A1 | * | 10/2003 | Clancey | A01G 13/0281 47/32 |
| 2004/0103580 A1 | | 6/2004 | Huang et al. | 47/9 |
| 2005/0025932 A1 | * | 2/2005 | Molino | A01D 46/26 428/102 |
| 2005/0150157 A1 | * | 7/2005 | Molino | A01D 46/26 47/1.01 R |
| 2006/0032116 A1 | | 2/2006 | Milliken | 47/21.1 |
| 2006/0130399 A1 | * | 6/2006 | McDonald | A01G 13/0281 47/58.1 SE |
| 2006/0150476 A1 | * | 7/2006 | McCrory | A01G 7/06 47/32 |
| 2008/0202023 A1 | * | 8/2008 | Moore | A01G 13/0281 47/9 |
| 2008/0271366 A1 | * | 11/2008 | Thompson | A01G 25/02 47/9 |
| 2011/0258922 A1 | * | 10/2011 | Frederick | A01G 13/0268 47/32.3 |
| 2013/0336729 A1 | * | 12/2013 | Hawkinson | A01G 13/0281 405/302.6 |
| 2014/0230322 A1 | * | 8/2014 | Zhang | A61L 11/00 47/32.8 |
| 2016/0227756 A1 | * | 8/2016 | Hawkinson | A01G 13/0256 |
| 2017/0196173 A1 | * | 7/2017 | Naganuma | A01G 22/00 |
| 2017/0223906 A1 | * | 8/2017 | Castellucci | A01G 13/0281 |

OTHER PUBLICATIONS

"*Weed Mats*" found at http://weedmat.en.alibaba.com/product/503294929-212572645/Virgin_Plastic_PE_PP_Weed_mat_or_Plastic_PE_PP_ground_cover.html.

\* cited by examiner

PLANT SKIRT AND METHOD FOR USE THEREOF

1. FIELD OF THE INVENTION

The present invention is directed to agricultural covers and methods for use thereof; and, more particularly, towards plant covers that are used to mitigate and/or prevent weed growth proximate to a plant.

2. DESCRIPTION OF RELATED ART

Agricultural environments often combat the problem of weeds. Plants' vitality is vastly affected by weed growth. Weeds generally include a class unwanted plants in farm fields, gardens, lawns, parks, woods, and other areas. The term typically is used to describe any plants that grow and reproduce aggressively in an undesired place. It is subjective, without any classification value, since a plant that is a weed in one context is not a weed when growing where it belongs or is wanted. Weeds are unwanted for a myriad of reasons. Most importantly, because they interfere with food and fiber production of agricultural plants and crops. In order to prevent lost or diminished crop yields, weed growth must be controlled.

Weeds are also unwanted because they interfere with cosmetic, decorative, or recreational landscaping of lawns, playing fields, and golf courses. Functionally and cosmetically weeds interfere by a) competing with garden plants for needed resources, namely, direct sunlight, soil nutrients, water, and space for growth; b) providing hosts for plant pathogens giving greater opportunity for infection and degradation of the quality of the garden plants; and/or c) risking irritation to the skin or digestive tracts of people or animals via thorns, prickles, burs, or chemical irritation caused by natural poisons or irritants in the weed. Weeds tend to have advantages over more desirable plants because they often grow quickly and reproduce quickly, have seeds that persist in the soil seed banks, or have short life spans with multiple generations in the same growing season.

In order to mitigate the invasion of weeds, chemical treatments, sheets, weed barrier systems, and weed tilling, as well as manual weed pulling, which is tedious and back-breaking, are typically used.

Chemical treatments have disadvantages owing to the chemicals utilized, which may kill some weed varieties, but can be hazardous to garden plants as well as people. Various sheets have been provided; these generally involve a long black plastic sheet wherein holes must be created for insertion of the plants. However, these sheets are cumbersome and require ripping of a hole for each plant. Weed tilling through use of a rototiller or the like is useful in large non-crop areas, such as between plant rows. However, tilling is not feasible in areas where garden plants are in close proximity to one another. Manual weed pulling is tedious and back-breaking. If a gardener goes away for an extended lime and does not tend regularly to the weed pulling, the weeds can quickly grow out of control.

Some examples of weed barrier systems heretofore disclosed and utilized in an attempt to address weed issues are set forth in summation below:

U.S. Pat. No. 1,704,801 to Oscar discloses a plant protector. The device comprises a protector or cover, preferably of cone shape and fashioned of semi-transparent or opaque material that is tough, strong, durable and thin, through which the sun's rays may penetrate to warm the atmosphere within the protector or cover for promoting the plant life.

U.S. Pat. No. 2,978,837 to James discloses a grass guard for trees. The guard comprises a flat horizontal base plate, a vertically disposed circular wall formed integrally with and depending from the peripheral edge for engaging in the ground, and a conical member integrally formed on the base plate and extending upwardly therefrom.

U.S. Pat. No. 3,305,969 to Mattson discloses a tree or plant protector collar. The protector is generally formed as a pad-like guard comprising a collar provided at its center with an opening of a predetermined size and shape and designed and adapted to encircle a tree's trunk with its marginal edge spaced radially from the encompassed surfaces of the trunk.

U.S. Pat. No. 4,584,789 to Jean et al. discloses an apparatus for enhancing the development of microorganisms needed to promote the growth and development of vegetation. The apparatus includes a relatively severely flared, frustoconical skirt portion which is adapted to cap the roots of vegetation within the ground. It also incorporates a small, generally cylindrical collar which extends above the ground and which surrounds the trunk of the vegetation being protected. A plurality of drains, formed by channels along the interior surface of the skirt and collar, extend over the length of generatrices of the apparatus and serve to conduct water and air to the roots of the vegetation.

U.S. Pat. No. 5,285,594 to Penny discloses a flat weed guard cover system which has at least two pieces. Each separate cover has a cut-out section and one or more flaps near the cut-out section. In use, a first weed guard cover is placed around a vertical structure with the structure protruding through the cut-out section and the flaps surrounding the vertical structure. A second cover section is then placed over the first with the vertical structure again protruding through the cut-out section of the second cover and the flaps of the second cover on top of the flaps of the first cover. The flaps may be sealed together by Epoxy glue or any other suitable manner. The edges of the cover may be secured to the ground by means of landscape staples.

U.S. Pat. No. 5,323,557 to Sonntag discloses a landscaping mat for surrounding a tree trunk and upstanding posts so as to eliminate the need to mow and trim around the tree or post. The mat includes a flexible inner portion, an intermediate portion surrounding the inner portion, and an outer portion surrounding the intermediate portion. The intermediate portion is thicker than the inner portion, and the outer portion is tapered to an outer perimeter edge. A slit extends from the perimeter edge to a central opening in the inner portion so as to allow the mat to be placed in position around a tree trunk or post. Alternatively, the slit may extend through the diameter of the mat so as to define two mirror image mat sections. Concentric scored lines are provided around the central opening and can be cut so as to increase the diameter of the opening so as to accommodate different sized tree trunks or posts. A rib may be provided on the intermediate portion for retaining ornamental materials, such as rocks, bark, wood chips or mulch. Alternatively, the upper surface of the mat may be textured and colored so as to resemble such ornamental materials.

U.S. Pat. No. 5,379,558 to Mason III discloses a ground covering mat creating a safe working environment around certain pedestals containing electrical and/or telephone equipment and for preventing the growth of vegetation around ground-anchored structures in general. Such structures include fire hydrants, pedestals for containing telephone or electrical circuitry, and gas vents. The mat includes a main body defined by an outer perimeter. The mat is constructed from synthetic fibers saturated with a resin containing ultraviolet inhibitors and a fire-retardant. The mat is resilient so as to conform to the shape of the ground for which it covers. The mat is designed to be substantially non-biodegradable. In a preferred embodiment, the mat has a concentric series of scored profiles defining successively larger interior sections. The scored profiles facilitate a user in cutting a central open area corresponding in with the size of the ground anchored structure. The mat further includes a plurality of stake openings around the periphery of the mat and adjacent to the outer edge. The mat is anchored to the ground around the ground-anchored structure by inserting stakes through the stake openings.

U.S. Pat. Nos. 5,647,951 and 6,311,911 to Bayer disclose a multi-purpose weed suppressant and plant growth enhancement device that includes an organic, biodegradable, layer and an impermeable sheet affixed to the underside of the organic layer to form a unitary ground collar. The ground collar defines at least one hole to allow growth of a plant therethrough while suppressing the growth of weeds or grass around the plant. The impermeable sheet is preferably formed from a slurry of cellulosic fiber and water and the organic layer is preferably formed from a slurry of fiber, water and finely chopped organic material, such as straw, manure, leaves or almond wood chips. The fiber and chopped organic material provide a semi-rigid mulch cover for suppressing weeds around the plant. The mulch cover is easily positioned around the plant and, once it is so disposed, will be relatively impervious to severe weather, such as heavy rainfall and winds. The chopped organic material, particularly almond wood chips, enhance the appearance of the mulch cover.

U.S. Pat. No. 6,705,044 to Clancey discloses adjustable landscaping ergonomic pads of various shapes adapted for covering the soil around the trunks of shrubs, trees, and garden plants to completely eliminate and retard the growth of weeds and other undesirable plants.

U.S. Pat. No. 6,976,334 to Bowditch discloses an outdoor planter system with a central opening through which a plant may grow. The planter portion surrounding the central opening is inwardly and downwardly sloped, generally impervious to liquid and light, and thereby directs liquid to the central opening while simultaneously preventing undesirable growth of weeds and the like about a central plant. The outer perimeter of the planter has several keyways for removably attachment of a planter cover. The keyways are also adapted to receive plant growing or animal protection cages.

U.S. Pat. No. 8,225,546 to Tajima et al. discloses a plant cultivation structure, root-preventing structure and root-preventing sheet used in them. The root-preventing layer structure comprises a resin film having the strength to be able to prevent extrusion of the plant root affixed to the construction surface; and an adhesive layer formed on the back face of the resin film, wherein a cover tape, which has an adhesive layer on the back face and has enough strength to be able to prevent extrusion of the plant root, is affixed to mutually abutting or overlapping resin film parts of the root-preventing layer to prevent extrusion of the plant root, and the thickness of the adhesive layer of the cover tape is formed to be smaller than the diameter of the extruding tip of the plant root.

U.S. Patent App. Pub. No. 20040103580 to Huang et al. discloses a weed-preventing paper with multiple functions for use in plant cultivation. The weed-preventing paper includes a paper body covering a surface of a soil where the plant is to be grown, and having at least a cross opening for the plant to pass there through, a weed-preventing agent contained in the paper body for blocking light so as to prevent the growth of a weed surrounding the plant, and a water indicator printed on the paper body and showing a hydrous and an anhydrous states thereof via different colors for being a reminder of watering.

U.S. Patent App. Pub. No. 20060032116 to Milliken discloses a garden weed barrier and watering apparatus including a flexible sheet of vapor-permeable material having reinforced, weighted edges to secure the sheet to the ground, openings in the sheet to receive garden plants, and a tube secured to the bottom of the sheet for delivering fluid to the plants.

Foreign Patent App. Pub. No. JP2010045988 to Shinohara discloses a seedling unit formed as a weed-proof sheet having water permeability and air permeability, a unit body comprising first and second lower sheets attached to the rear surface of the weed-preventive sheet in a laminated fashion, and culture soil charged in a storage bag formed by the first and second lower sheets. The weed-proof sheet has a skirt part whose outside extends outward so as to surround the peripheries of the first and second lower sheets. The first and second lower sheets have water permeability and air permeability. The second lower sheet is disposed between the first lower sheet and the weed-proof sheet. The seedling is planted in the culture soil through the weed-proof sheet and the second lower sheet.

Foreign Patent App. Pub. No. DE10118360 to Huang et al. discloses a cover for preventing weed growth around plants that comprises two semi-circular fiberboard panels with central, semicircular cut-outs which fit around plant and dovetailed edges so that they interlock. The cover for preventing weed growth around plants comprises two semi-circular fiberboard panels. These have central, semicircular cut-outs which fit around the plant and dovetailed edges so that they interlock.

Non Patent Literature entitled "Weed Mats" found at weedmat.cn.alibaba.com/ discloses a woven polyethylene/polypropylene sheet or roll for weed control.

Though aforementioned weed coverings have been disclosed and utilized there remains a need in the art for a weed barrier system that is easy to install and substantially eliminates weed encroachment. Several of the heretofore disclosed and utilized weed coverings are formed as sheets, which are difficult to install, tending to be cumbersome and bulky, and in need of being cut to size to accommodate a plant area. Even where weed coverings are not constructed as sheets but smaller pieces, these coverings typically require the need to stake the portions into the ground, which can be difficult in rocky soil and risk dislodgement and loosening over the growing season. Still other coverings are not adequately secured and as a result weed growth can occur. Therefore, it is an object of the present disclosure to obviate the disadvantages from the existing art and to provide a plant skirt that is easy to install, remains reliably in place and virtually eliminates weed growth.

SUMMARY OF THE INVENTION

The present invention provides a garden weed barrier system that is easy to construct and comprises a plurality of interlocking barrier members that virtually eliminate or mitigate weed encroachment. The weed barrier system is readily provided by a plant skirt that is easy to construct and install, and virtually eliminates weed encroachment. Generally, the plant skirt is constructed from landscaping material and is comprised of a plurality of shaped single weed barrier members, preferably having a parallelogram shape, most preferably a substantially square shape. Preferably, the barrier members are constructed forming a flat surface so that the barrier members substantially abut the ground surface with the body, central aperture, perimeter and outer edges of the barrier member abutting or substantially in contact with the ground.

The barrier members are constructed in a manner so that the members can individually be placed over a single plant's soil area. Multiple members are appointed to be placed in relation to one another to form a patch-work or quilt-like arrangement in a garden, or landscaping bed. Preferably, the barrier members are constructed of landscaping material, including plastic, fabric, burlap, natural fibers, etc. After formation of a barrier member, preferably as a square shape, additional landscaping material is then cut and formed into tubes, which are thereafter filled with sand and closed by sewing or the like. The tubes are then sewn onto the flat landscaping material barrier members to form a weighted edge perimeter. A non-toxic fabric spray paint can be used to impart color to the rectangular squares, thereby forming a patchwork quilt effect. Each barrier member may be of a different color and/or have designs or patterns thereon, for a decorative effect in forming a quilt or patchwork effect in the garden bed.

In a first broad embodiment the subject plant skirt comprises, in combination, a) a barrier member having a substantially flat body constructed from landscaping material and outer rim edge; b) the body includes a weighted edge perimeter, wherein the perimeter is constructed having sand therein (i.e. weighted outer edge (sand)); c) at least one edge area of the body has a weighted edge perimeter including an elongated slit. The elongated slit extends to and terminates at a center aperture in the flat body. The elongated slit has overlapping capable sides, and the center aperture is a small opening appointed to surround a plant's stem so that the stem is flush against the center aperture such that a weed cannot grow between the center aperture and the stem.

When a barrier member is appointed to be placed in association with a plant, the elongated slit is opened. The plant stem is placed against the center aperture and the elongated slit is then closed to thereby block sunlight exposure in the slit area, as well as an area around the plant, so that weeds do not grow in the immediate vicinity of the plant. The perimeter presses firmly onto the ground and prevents the barrier member from coming up or dislodging from its location despite wind and/or rain. Each barrier member may be of a different color and/or have designs or patterns thereon. The designs or color patterns provide a decorative appearance that forms a quilt or patchwork effect in the garden bed. Barrier members can be made in several different sizes to accommodate different plant species. Barrier members are preferably composed of landscaping materials that are environmentally friendly and decomposable. Optionally, the barrier members may further comprise a layer on the underside thereof formed as a coating of miracle grow or plant food/nutrients. In another embodiment, a garden weed barrier system for eliminating weed encroachment, comprises: (a) a barrier member having a substantially flat body constructed from landscaping material and outer rim edge; (b) the body including a weighted edge perimeter; and (c) at least one edge area of body and weighted edge perimeter including an elongated slit extending to and terminating at a center aperture of the body, the elongated slit having overlapping capable sides and the center aperture being a small opening appointed to surround a plant's stem, so that the stem is sufficiently flush against the center aperture that a weed cannot easily grow between the center aperture and the stem. Whereby the barrier member is appointed to be placed in association with a plant when the elongated slit is opened. The plant stem is placed against the center aperture, and the elongated slit is then closed to thereby block sunlight exposure in the slit as well as an area around the plant to substantially mitigate weed growth. Advantageously, the perimeter prevents the barrier member from rising up or becoming dislodged from its location despite wind and/or rain.

A method of using a garden weed barrier system for eliminating weed encroachment is also provided. The method comprises the steps of first selecting a barrier member, comprising: (i) a substantially flat body constructed from landscaping material and outer rim edge; (ii) the body including a weighted edge perimeter, wherein the perimeter is constructed with sand therein; and (iii) at least one edge area of body and weighted edge perimeter including an elongated slit extending to and terminating at a center aperture of the body, the elongated slit having overlapping capable sides and the center aperture being a small opening appointed to surround a plant's stem, so that the stein is sufficiently flush against the center aperture that a weed cannot easily grow between the center aperture and the stem. Next, the barrier member is placed in association with a plant and opening the elongated slit and sliding the stem against the center aperture. Closing the elongated slit is then carried out, thereby blocking sunlight exposure in the slit as well as an area around the plant to substantially mitigate weed growth. Lastly, the method involves securing the perimeter of the barrier member to prevent the barrier member from rising up or becoming dislodged from its location despite wind and/or rain.

BRIEF DESCRIPTION OF THE DRAWINGS

The advantages and features of the present disclosure will become better understood with reference to the detailed description taken in conjunction with the accompanying drawings, wherein like elements are identified with like symbols, and in which.

DETAILED DESCRIPTION OF THE DISCLOSURE

The best mode for carrying out the present disclosure is presented in terms of the embodiment, herein depicted in the Figures. The embodiment(s) described in detail herein are for illustrative purposes and may be subject to many variations. It is understood that various omissions and substitutions of equivalents are contemplated as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. Any headings utilized within description are for convenience only and have no legal or limiting effect.

The terms "a" and "an" herein do not denote a limitation of quantity, but rather denote the presence of at least one of the referenced items.

The subject plant skirt is directed to a garden weed barrier system that virtually eliminates gardening problems associated with weed encroachment. The weed barrier system is provided by a plant skirt that is easy to construct and install. The plant skirt is light weight and safe for the environment. Generally, the plant skirt is constructed from landscaping material and is comprised of a plurality of shaped single weed barrier members, preferably having a parallelogram shape, and most preferably a substantially square shape. The barrier members are constructed in a manner so that the members can individually be placed over a single plant's soil area.

Multiple members are appointed to be placed in relation to one another to form a patch-work or quilt-like arrangement in a garden, or landscaping bed. Preferably, the barrier members are constructed of landscaping material, including plastic, fabric, burlap, natural fibers, or the like. After formation of a barrier member, preferably as a square shape, additional landscaping material is then cut and formed into tubes, which are thereafter filled with sand and closed by sewing or the like. The tubes are then sewn onto the flat landscaping material barrier members to form a weighted edge perimeter. A non-toxic fabric spray paint can be used to impart color to the rectangular squares, thereby forming a patchwork quilt effect. Each barrier member may be comprised of a different color and/or have designs or patterns thereon, to thereby create a decorative effect, such as a patchwork quilt, in the garden bed.

Figure 1:
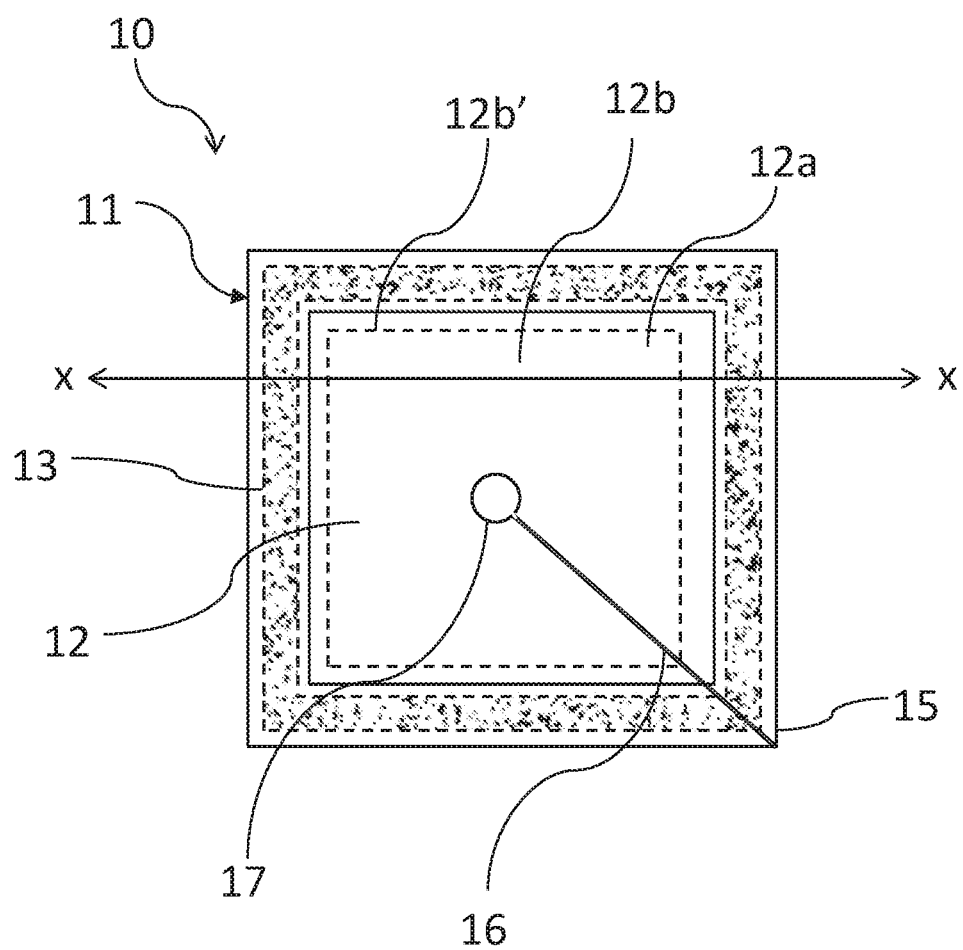
FIG. 1 illustrates a top plan view of an embodiment of the subject plant skirt.
Figure 2:
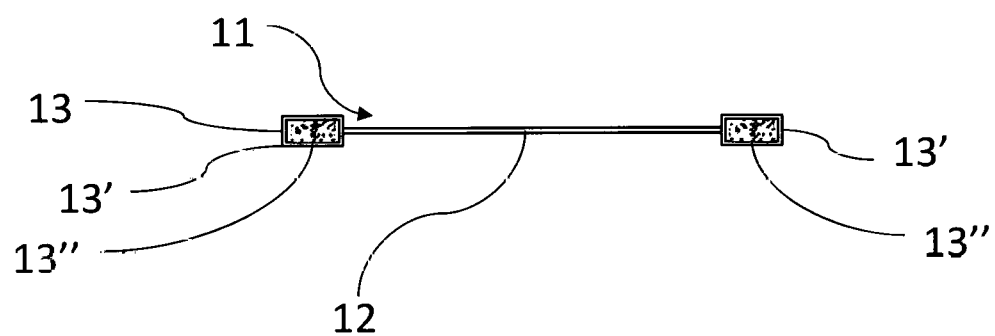
FIG. 2 illustrates a cross-sectional view taken at x-x in FIG. 1.
Figure 3:
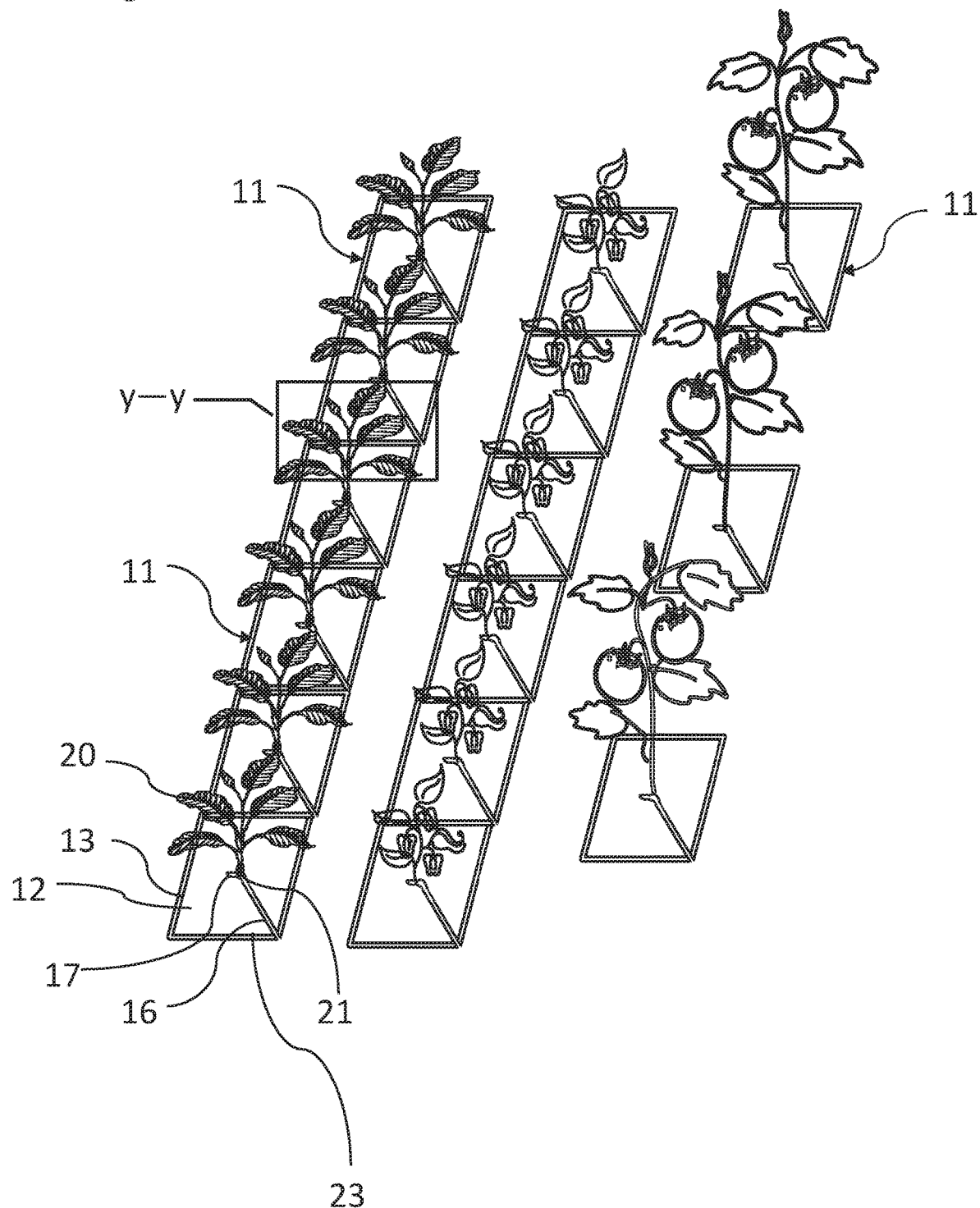
FIG. 3 illustrates a schematic view of a garden wherein a plurality of plant skirts is arranged in a garden.

FIG. 1 shows a top plan view of the 'Plant Skirt; FIG. 2 shows a cross-sectional view taken at x-x in FIG. 1; FIG. 3 shows a schematic view of a garden wherein a plurality of plant skirt members are placed. Referring to FIGS. 1-3, the plant skirt is shown generally at 10, and comprises a barrier member 11 having a substantially flat body 12 having a top surface 12a and a bottom surface 12b, and being constructed from landscaping material. Barrier member 11 is preferably composed of landscaping materials that are environmentally friendly and decomposable. Optionally, barrier member 11 may further comprise a layer 12b' on at least a portion of bottom surface 12b, provided as a coating of fertilizer, such as that sold under the trademark Miracle-Gro by Scott's, or plant food/nutrients that slowly degrade over time during the plant growing season. Alternatively, the fertilizer, such as that sold under the trademark Miracle-Gro by Scott's, or plant food/nutrients may be integrally composed within the material of the barrier member 11 wherein the barrier member 11 is composed of a biodegradable material or fiber that substantially disintegrates during the growing season/or within a period of approximately six months. Preferably, flat body 12 is shaped as a parallelogram; most preferably it is substantially a square shape so that a plurality of barrier members 11 can be placed in an interconnecting abutting manner. Body 12 includes a weighted edge perimeter 13. Perimeter 13 is constructed via cutting landscaping material and forming same into tubes 13 ', which are thereafter filled with sand 13" and closed by sewing or the like (best illustrated in FIG. 2). Tubes 13' are then sewn onto the flat landscaping material barrier member's body 12 to form the weighted edge perimeter 13.

At a corner edge area of body 12, herein shown at edge 15, an elongated slit 16 extends to a center aperture 17 through body 12. Center aperture 17 is preferably centrally located in body 12. Center aperture 17 is preferably a shallow circular opening, or a slit. Center aperture 17 is a small opening; this enables stem 21 of plant 20 (see FIG. 3) to be flush against center aperture 17 so that a weed cannot grow between center aperture 17 and stem 21.

In application, a barrier member 11 is selected to be placed in association with a plant 20. Elongated slit 16 is opened and stem 21 is placed against center aperture 17. Elongated slit 16 is then closed, virtually eliminating sunlight exposure in the slit 16 area, as well as the area 23 around plant 20 so that weeds do not grow in the vicinity/area 23 of plant 20. Perimeter 13 presses firmly onto the ground and prevents barrier member 11 from coming up or dislodging from its location despite wind and/or rain. Each barrier member may be a different color and/or have designs or patterns thereon, to thereby create a patchwork quilt or other decorative effect in the garden bed. Barrier members 11 can be made in several different sizes to accommodate different plant species.

Figure 4:
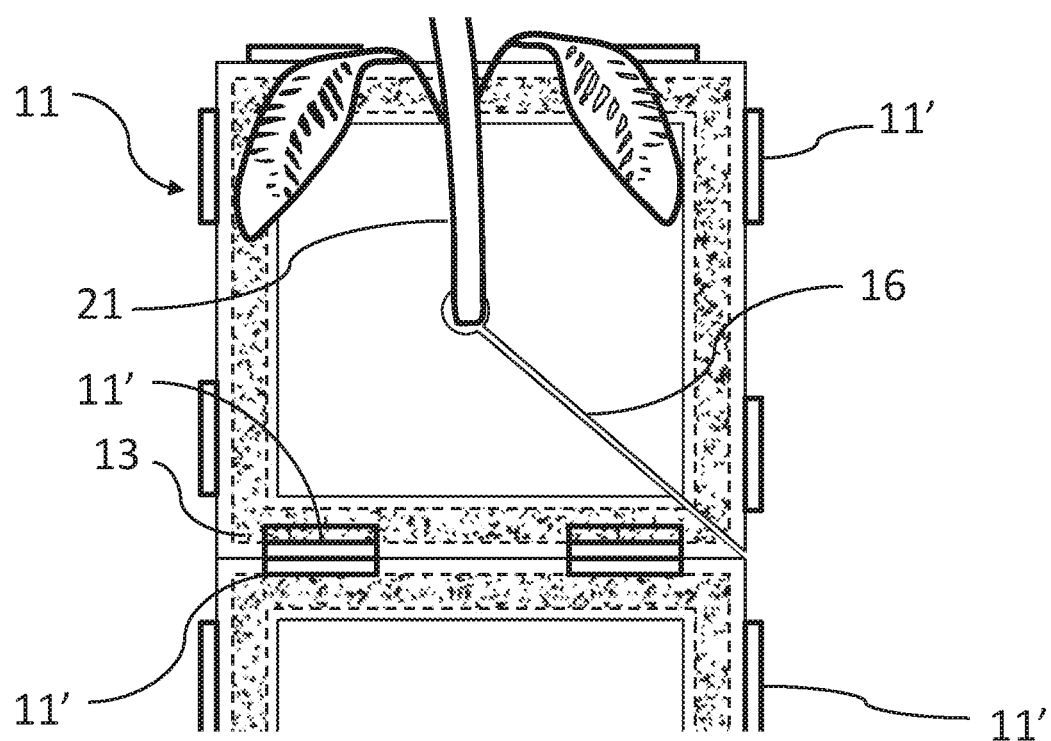
FIG. 4 illustrates a cross-sectional view taken at y-y in FIG. 3, showing an embodiment of the barrier members wherein the barrier members include attachment means for interconnecting the barrier members.

FIG. 4 illustrates a cross-sectional view taken at y-y in FIG. 3, showing an embodiment of the barrier members 11 including attachment means 11' on their perimeter 13 for interconnecting the barrier members. Attachment means 11' are preferably tabs with hook and loop closures thereon, such as those sold under the trade name VELCRO, that engage with other tabs/attachment means 11' on proximal members 11 to securely interconnect the members 11.

Figure 5:
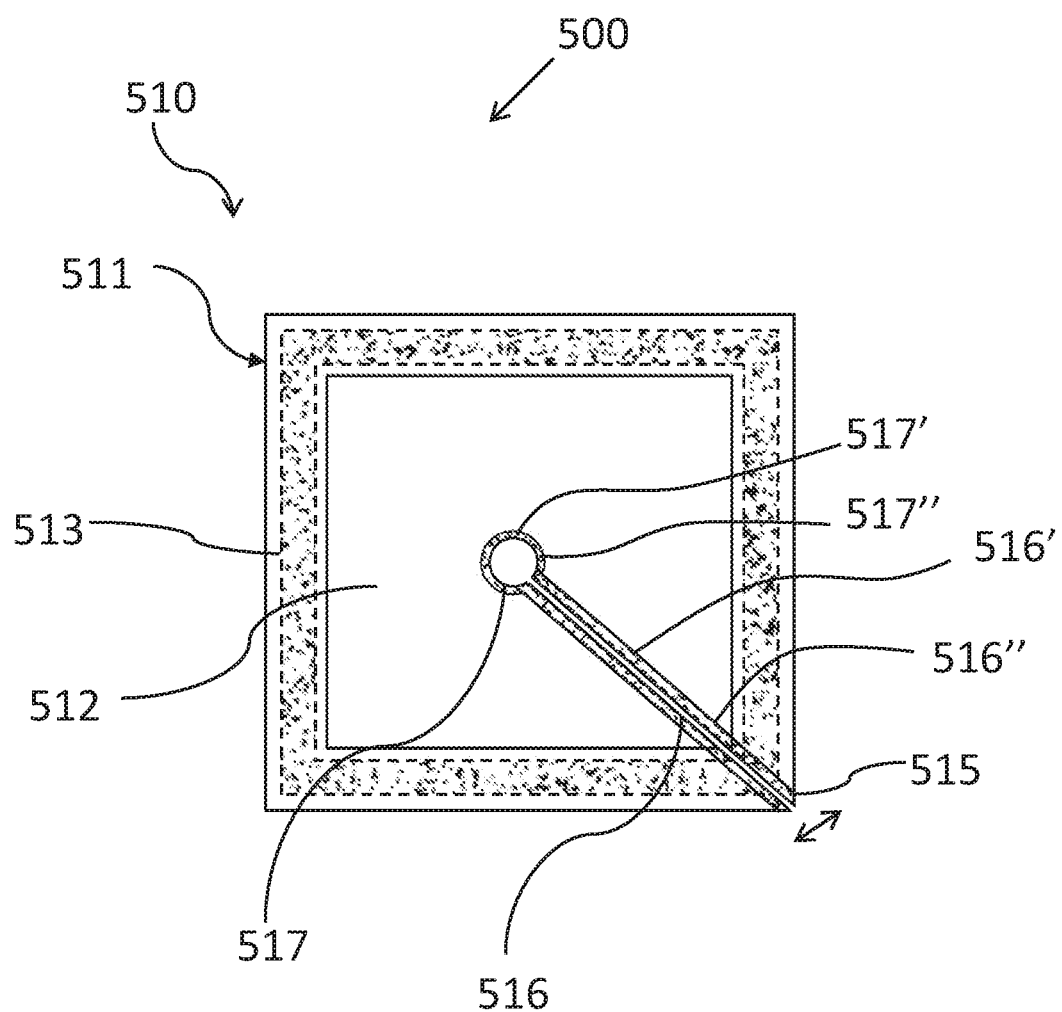
FIG. 5 illustrates an embodiment of the slit wherein it includes a weighted slit perimeter, and wherein the center aperture comprises a center weighted edge perimeter, wherein the perimeter is constructed with sand therein.

FIG. 5 illustrates an embodiment of the slit that includes a weighted slit perimeter, and wherein the center aperture comprises a center weighted edge perimeter, wherein the perimeter is constructed with sand therein, shown generally at 500. The plant skirt 510 comprises a barrier member 511 having a substantially flat body 512 constructed from landscaping material. Preferably, flat body 512 is shaped as a parallelogram; most preferably it is substantially a square shape so that a plurality of barrier members 511 can be placed in an interconnecting abutting manner. Body 512 includes a weighted edge perimeter 513. Perimeter 513 is constructed via cutting landscaping material and forming same into tubes 513', which are thereafter filled with sand 513" and closed by sewing or the like (best illustrated in FIG. 2). Tubes 513' are then sewn onto the flat landscaping material barrier member's body 512 to form the weighted edge perimeter 513.

At a corner edge area of body 512, herein shown at edge 515, an elongated slit 516 extends to a center aperture 517 through body 512. In the embodiment shown, aperture 517 and/or slit 516 include a weighted edge perimeter 517' and 516', respectively. Perimeters 517' and 516' are constructed via cutting landscaping material and forming same into tubes, which are thereafter filled with sand 517" and 516" and closed by sewing or the like to form the weighted edge perimeters 517' and 516'.

Figure 6:
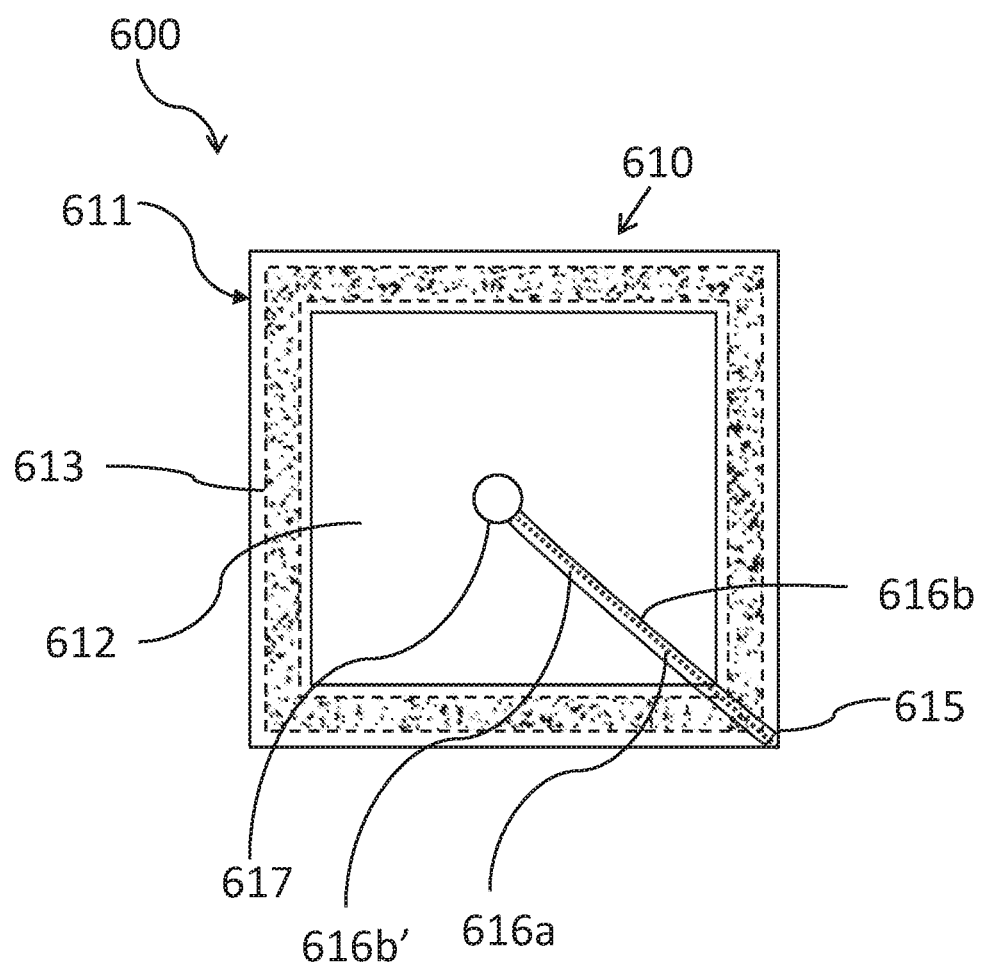
FIG. 6 illustrates an embodiment of the slit wherein the barrier member includes a slit closure means formed as a flap for substantially sealing the slit closed.

FIG. 6 illustrates an embodiment of the slit wherein the barrier member includes a slit closure means formed as a flap for substantially sealing the slit closed, shown generally at 600. The plant skirt 610 comprises a barrier member 611 having a substantially flat body 612 constructed from landscaping material. Preferably, flat body 612 is shaped as a parallelogram; most preferably it is substantially a square shape so that a plurality of barrier members 611 can be placed in an interconnecting abutting manner. Body 612 includes a weighted edge perimeter 613. Perimeter 613 is constructed via cutting landscaping material and forming same into tubes 613', which are thereafter filled with sand 613" and closed by sewing or the like (best illustrated in FIG. 2). Tubes 613' are then sewn onto the flat landscaping material barrier member's body 612 to form the weighted edge perimeter 613.

At a corner edge area of body 612 an elongated slit 616 extends to a center aperture 617 through body 612. In the embodiment shown, elongated slit 616 includes a slit edge 616a and 616b. Edge 616b includes a flap 616b' for substantially sealing the slit 616 closed. Optionally, edge 616a may include a mating hook and eye fastener strip that mates with a hook and eye fastener strip on the underside of flap 616b'.

The foregoing descriptions of specific embodiments of the present disclosure have been presented for purposes of illustration and description. Each of the plant skirts set forth can be modified in size, color and material without departing from the scope of the invention. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated. These embodiments, as well as the modifications and variations thereof, are intended to fall within the scope of the invention, as defined by the subjoined claims.

What is claimed is:

1. A garden weed barrier system for eliminating weed encroachment, comprising:
   a. at least one barrier member having a single substantially flat continuous us body constructed from landscaping material and an outer rim edge;
   b. the body including a weighted edge perimeter extending substantially entirely around the body and being proximal to the outer rim edge, wherein the perimeter is constructed with sand therein;
   c. at least one edge area of the body and the weighted edge perimeter including an elongated slit intersecting the weighted edge perimeter and extending from an exterior corner edge and terminating at an interior center aperture of the body, the elongated slit having overlapping capable sides and the center aperture being an opening to surround a plant's stem, so that the stem is sufficiently flush against the center aperture that a weed cannot easily grow between the center aperture and the stem;
   d. the slit including a weighted slit perimeter, the weighted slit perimeter extending from the exterior corner edge through the body to the interior center aperture, wherein the weighted slit perimeter is constructed with sand therein;
   wherein the at least one barrier member is to be placed in association with a plant when the elongated slit is opened, the plant stem is placed against the center aperture, and the elongated slit is then closed to thereby block sunlight exposure in the slit as well as an area around the plant to substantially mitigate weed growth, and the perimeter prevents the at least one barrier member from raising up or becoming dislodged despite wind or rain.

2. The garden weed barrier system as recited in claim 1, wherein there are a plurality of barrier members.

3. The garden weed barrier system as recited in claim 2, wherein each of the at least one barrier member includes an attachment for interconnecting the barrier members.

4. The garden weed barrier system as recited in claim 1, wherein the flat body of the barrier member is a parallelogram.

5. The garden weed barrier system as recited in claim 1, wherein the center aperture is centrally located in the flat body.

6. The garden weed barrier system as recited in claim 1, wherein the center aperture is capable of being sized to accommodate different sized plant stems.

7. The garden weed barrier system as recited in claim 1, wherein the slit includes a slit closure.

8. The garden weed barrier system as recited in claim 7, wherein the slit includes a flap for substantially sealing the slit closed.

9. The garden weed barrier system as recited in claim 1, wherein the at least one barrier member is composed of a porous material.

10. The garden weed barrier system as recited in claim 1, wherein the at least one barrier member is composed of a polymeric material.

11. The garden weed barrier system as recited in claim 1, wherein the at least one barrier member is composed of a fibrous material.

12. The garden weed barrier system as recited in claim 1, wherein the at least one barrier member is composed of a decomposable material capable of decomposing over a plant growth season.

13. The garden weed barrier system as recited in claim 1, wherein the at least one barrier member comprises tubes which are filled with the sand to form the weighted edge perimeter.

14. The garden weed barrier system as recited in claim 1, wherein said center aperture comprises a center weighted edge perimeter, wherein the center weighted edge perimeter is constructed with sand therein.

15. The garden weed barrier system as recited in claim 1, wherein the at least one barrier member includes fertilizer, or plant food/nutrients.

16. A garden weed barrier system for eliminating weed encroachment, comprising:
   a. at least one barrier member having a single substantially flat continuous body constructed from landscaping material and an outer rim edge;
   b. the body including a weighted edge perimeter extending substantially entirely around the body and being proximal to the outer rim edge;
   c. at least one edge area of the body and the weighted edge perimeter including an elongated slit intersecting the weighted edge perimeter and extending from an exterior corner edge and terminating at an interior center aperture of the body, the elongated slit having overlapping capable sides and the center aperture being an opening to surround a plant's stem, so that the stem is sufficiently flush against the center aperture that a weed cannot easily grow between the center aperture and the stem;
   d. the slit including a weighted slit perimeter, the weighted slit perimeter extending from the exterior corner edge through the body to the interior center aperture, wherein the weighted slit perimeter is constructed with sand therein;

wherein each of the at least one barrier member is to be placed in association with a plant when the elongated slit is opened, the plant stem is placed against the center aperture, and the elongated slit is then closed to thereby block sunlight exposure in the slit as well as an area around the plant to substantially mitigate weed growth, and the perimeter prevents the at least one barrier member from raising up or becoming dislodged despite wind or rain.

17. A method of using a garden weed barrier system for eliminating weed encroachment, comprising:
   a. selecting at least one barrier member, each barrier member comprising:
      i. a single substantially flat continuous body constructed from landscaping material and an outer rim edge;
      ii. the body including a weighted edge perimeter extending substantially entirely around the body and being proximal to the outer rim edge, wherein the perimeter is constructed with sand therein;
      iii. at least one edge area of the body and the weighted edge perimeter including an elongated slit intersecting the weighted edge perimeter and extending from an exterior corner edge and terminating at an interior center aperture of the body, the elongated slit having overlapping capable sides and the center aperture being an opening to surround a plant's stem; and
      iv. the slit including a weighted slit perimeter, the weighted slit perimeter extending from the exterior corner edge through the body to the interior center aperture, wherein the weighted slit perimeter is constructed with said therein;
   b. placing each barrier member in association with a plant and opening the elongated slit and sliding the stem against the center aperture;
   c. closing the elongated slit thereby blocking sunlight exposure in the slit as well as an area around the plant to substantially mitigate weed growth;
   d. securing the perimeter of each barrier member to prevent the barrier member from raising up or becoming dislodged from its location despite wind and/or rain.

* * * * *